2,987,558
ORGANOMETAL COMPOUNDS

Sidney M. Blitzer and Tillmon H. Pearson, Baton Rouge, La., assignors to Ethyl Corporation, New York, N.Y., a corporation of Delaware
No Drawing. Filed Nov. 13, 1959, Ser. No. 852,635
4 Claims. (Cl. 260—665)

This invention relates to the manufacture of organometal compounds and more particularly to alkyl compounds of lithium, sodium, potassium, rubidium, cesium, calcium, strontium and barium.

Alkyl compounds of the above metals are becoming increasingly important as intermediates in the manufacture of a number of chemical compounds and as catalysts in olefin polymerization reactions. For example, the products of this invention are particularly suitable in the conversion of a wide variety of metal halides to their alkyl derivatives as indicated in the general reaction $$nMCl_m + mM'R_n \rightarrow nMR_m + mM'Cl_n$$

The principal methods for preparation of the above metal alkyl compounds are classical laboratory techniques but are not suitable for commercial processes. These methods are illustrated in the following general equations:

(1) $M + nRX \rightarrow MX_n + MR_n$
(2) $nM'R_m + mM \rightarrow mMR_n + nM'$
(3) $MCl_n + nRM'X \rightarrow MR_n + nM'XCl$
(4) $M_nM'_n + mnRI \rightarrow nM'R_m + mMI_n$ In view of the commercial importance of these metal alkyl compounds an improved method for their economical and commercial production is in great demand.

It is accordingly an object of this invention to provide an improved process for the preparation of metal alkyl compounds. Another object is to provide a process of the above type which is economical and readily carried out on a commercial scale, utilizing a minimum of process steps. Another object is to provide a process using a metal compound which can be readily prepared from the elemental metal and from an olefin hydrocarbon. Another object is to provide an improved process for manufacturing alkyl compounds of lithium, sodium, potassium, rubidium, cesium, calcium, strontium and barium. Other objects and advantages of this invention will become apparent from the following description and appended claims.

We have now found that the above metal alkyls, for example, lithium ethyl, can be readily and economically produced by reacting the metal hydride with ethylene or other olefins to produce the corresponding alkyl metal compounds. The process comprises reacting the olefin and metal hydride at temperatures from about 50° up to about 300° C. or higher and preferably at a temperature between about 90° and 200° C. At these temperatures, no polymerization of the olefin takes place and the metal alkyl product is recovered in essentially quantitative yields. The reaction can be carried out in the presence of solvents, including ethers, such as diethyl ether or the ethers of glycol or polyglycols.

Pressures can be used in the reactor up to about 700 atmospheres. Normally, it is desired to employ enough pressure to have sufficient olefin for the reaction, e.g., two mols of olefin per mole of divalent metal hydride. The most preferred operation is obtained using elevated pressures which permit the use of higher reaction temperatures and prevent decomposition of the metal hydride. Preferred pressures range from 15 to 500 atmospheres.

The reaction can be carried out in a liquid reaction medium as a solvent or suspension vehicle. As pointed out above, ethers can be employed as well as hydrocarbons, such as hexane, octane, decane, toluene and xylene. Either aliphatic or aromatic ethers are suitable as solvents for the reaction. Typical examples are diethyl ether, dipropyl ether, dibutyl ether, methyl phenyl ether, dioxane, dimethyl ether of ethylene glycol, dimethyl or diethyl ether of diethylene glycol and the like. When using pressure operation, dimethyl ether is also suitable. In general, the solvent should have a different volatility from the alkyl metal product to permit easy separation of the reaction mixture. For this purpose, the solvent can be either more volatile or less volatile than the product.

The process can be carried out in either a batch or continuous operation. In most cases, continuous processing is desired for obvious economic reasons. The reaction time varies both with reactants and operating conditions. In general, reaction periods between about 30 minutes and several hours are normally required, generally from 1–20 hours.

A wide variety of olefins are suitable for the present invention. In addition to ethylene, propylene, α-butylene, α-hexylene, styrene, α-dodecylene, cyclohexylene and other substituted and branched olefins are suitable. In some cases, mixtures of olefins can be employed to produce mixed alkyls of polyvalent metals. Preferably, when mixed metal alkyls are desired, the metal hydride is first partially reacted with one olefin to give the alkyl metal hydride and thereafter further reacted in a second step with another olefin to complete the alkylation.

In some cases, it is desirable to employ a catalyst in the reaction. Typical examples of suitable catalysts are metal hydrides including those of sodium, magnesium, aluminum, lithium, lithium aluminum, sodium boron and the like. The metal chlorides are also suitable, such as stannic chloride, zinc chloride and aluminum chloride. Certain of the elemental halides are useful, particularly iodine. The metal alkyls also catalyze the reaction. Typical examples of metal alkyls are triethyl aluminum, tetramethyl sodium aluminum, tributyl aluminum, trihexyl aluminum, diethyl magnesium and dibutyl magnesium. Metalloid hydrides of phosphorus, arsenic and antimony are also suitable. Metalloid alkyl compounds and aryl compounds are also useful. The alkyl halides, particularly alkyl iodides such as ethyl iodide are effective. In some cases, acidic catalysts such as boron trifluoride and combinations of boron trifluoride and hydrofluoric acid are also effective.

Typical examples of alkyl metal compounds which can be produced by the present process are ethyl lithium, propyl lithium, n-butyl lithium, isobutyl lithium, n-hexyl lithium, octyl lithium, cyclohexyl lithium, β-phenylethyl lithium, and the like. The metal alkyl products are highly suitable as reaction catalysts for olefin polymerization or other reactions.

The following are typical examples illustrating the present invention but these examples are not intended to in any way limit the same.

Example I

Eight parts of lithium hydride is suspended in 200 parts of hexane and placed in a high pressure bomb and sealed. The latter is then pressurized with pure dry ethylene sufficient to give a pressure of 200 atmospheres when heated to a temperature of 100° C. The bomb is brought up to reaction temperature (100° C.) and maintained at reaction temperature for 8 hours, after which time the reaction pressure is essentially constant. After cooling, the excess ethylene is vented, the bomb is opened, and the contents are decanted, under an atmosphere of dry nitrogen, into a receiver fitted for distillation. The solvent is stripped off and the ethyl lithium product is fused and then cooled to crystallize it, all in an atmosphere of dry nitrogen or other inert gas.

Example II

Example I is repeated except that ethylene and sodium hydride are reacted in dibutyl ether solvent at a temperature of 80° C. and 200 atmospheres' pressure. Also, 0.5 part of lithium aluminum hydride is employed as a catalyst. The ethyl sodium product is recovered in excellent yield and is effective when used in many Grignard-type reactions.

Example III

Example I is repeated except that calcium hydride is reacted with propylene using toluene as the suspension agent at 90° C. and 400 atmospheres' pressure. In this example, 0.5 part of triethyl aluminum is employed as a catalyst.

Mixed metal hydrides are suitable for this invention and are included in the scope of the appended claims. Particularly suitable are mixed hydrides of alkali metals with calcium, strontium and barium. Typical examples of suitable mixed hydrides are lithium and calcium hydrides, lithium and strontium hydrides, lithium and barium hydrides, sodium and calcium hydrides, sodium and strontium hydrides, sodium and barium hydrides, potassium and calcium hydrides, potassium and strontium hydrides, rubidium and calcium hydrides, calcium and strontium hydrides, and cesium and strontium hydrides. Also suitable are lithium and sodium hydrides, sodium and potassium hydrides and strontium and barium hydrides. The following example illustrates the use of mixed hydrides in the process of this invention.

Example IV

Example I is repeated except that a mixture of sodium hydride and strontium hydride is reacted with ethylene using di-isopropyl ether as the suspension agent at 180° C. and 300 atmospheres' pressure. In this example, 0.5 part of methyl phosphine is employed as a catalyst.

The foregoing examples are susceptible of a large number of variations and modifications, some of which are described below.

Example V

In this operation 8.2 parts of lithium hydride was added to 4,500 parts of a liquid reaction medium comprising the dimethyl ether of diethylene glycol. The lithium hydride was added as a 20 weight percent dispersion in "Nujol," a highly purified aliphatic hydrocarbon liquid. Sodium aluminum tetramethyl was added as a catalyst in proportions of about 0.1 mole per mole of lithium hydride charged. The charge was introduced to a reaction autoclave fitted with agitating means, and pressurized with ethylene. Reaction was carried out for a period of 14 hours, the temperature and ethylene pressure during most of this period being 125° C. and 1,850 pounds per square inch, respectively. At the conclusion of the reaction period, the reactor and contents were cooled and vented to atmospheric pressure. A significant quantity of ethylene had reacted. Analysis of the product mixture, by hydrolysis and mass spectrography showed a good conversion of the lithium hydride to lithium ethyl.

In the examples, when α-butylene, α-hexylene, α-octylene, α-dodecylene, styrene, or cyclohexylene is employed, similar results are obtained, except that of course, the higher alkyl compounds are formed. Non-α-olefins, that is, olefins which do not contain a terminal double bond, can also be used but, in general, they react much more slowly than the α-olefins.

Moreover, in the examples, when the hydride of potassium, rubidium, cesium, strontium, or barium is used, similar results are obtained, except that the alkyl derivatives of these metals are formed.

Other solvents or suspension agents can be used in the above examples if desired. When ethers, such as dimethyl, diethyl, dipropyl, and methyl phenyl ethers and dioxane, and hydrocarbons, including aromatic hydrocarbons such as benzene, and xylene, and aliphatic hydrocarbons, including branched components such as isooctane, and decane, are used in Example I or V, for example, similar results are obtained.

Other catalysts can also be used. In Example II, when sodium hydride, magnesium hydride, aluminum hydride, lithium hydride, stannic chloride, zinc chloride, aluminum chloride, iodine, tributyl aluminum, trihexyl aluminum, diethyl magnesium, dibutyl magnesium, phosphine, arsine, stibine, ethyl iodide, boron trifluoride, or hydrofluorboric acid is used, similar results are obtained.

Furthermore, the temperature, reaction pressure, reaction time, and ratio of reactants specified above can be varied within relatively wide limits, determined by the characteristics of the olefin used. For example, temperatures of 60°, 100°, and 250° C., and pressures of 15, 100, and 600 atmospheres, give similar results. When, in Example I, reaction periods of one and 20 hours are used, similar results are obtained.

We claim:
1. A process for producing an alkyl metal compound comprising forming a reaction system consisting essentially of a metal hydride as hereafter defined and a non-reacting liquid reaction medium, and reacting the metal hydride in said reaction system with an aliphatic mono-olefin at a temperature between about 50 and 300° C. at a supra-atmospheric pressure of from 15 to 500 atmospheres, the aliphatic mono-olefin being reacted in proportions corresponding to the stoichiometric equivalent of the metal hydride reacted, and forming thereby an alkyl metal compound of the metal of the metal hydride employed, the metal hydrides being selected from the group consisting of the hydrides of lithium, sodium, potassium, rubidium, cesium, calcium, strontium and barium.

2. The process of claim 1 wherein the olefin is ethylene.

3. The process of claim 1 wherein the olefin is propylene.

4. The process of claim 1 wherein a catalyst for the reaction is employed.

References Cited in the file of this patent

UNITED STATES PATENTS

| 2,771,495 | Pines et al. | Nov. 20, 1956 |
| 2,848,506 | Breslow | Aug. 19, 1958 |

FOREIGN PATENTS

| 924,029 | Germany | Feb. 24, 1955 |
| 1,000,379 | Germany | Jan. 10, 1957 |